United States Patent [19]

Kravitz

[11] 4,237,864

[45] Dec. 9, 1980

[54] FOCUSING SOLAR COLLECTOR

[76] Inventor: Barry Kravitz, 334 A Thomas Rd., Middleboro, Mass. 02324

[21] Appl. No.: 906,103

[22] Filed: May 15, 1978

[51] Int. Cl.$^3$ ............................................. F24J 3/02
[52] U.S. Cl. ................................. 126/425; 126/438
[58] Field of Search .............. 126/270, 271, 425, 424, 126/438, 451, 439, 419; 350/295, 310; 353/3

[56] References Cited

U.S. PATENT DOCUMENTS

| | | | |
|---|---|---|---|
| 3,445,157 | 5/1969 | Zitter | 350/295 |
| 3,574,447 | 4/1971 | Ruble | 350/295 |
| 3,893,755 | 7/1975 | Cobarg et al. | 350/295 |
| 3,923,039 | 12/1975 | Falbel | 126/424 |
| 3,972,600 | 8/1976 | Cobarg | 350/295 |
| 4,015,585 | 4/1977 | Fattor | 126/438 X |
| 4,046,462 | 9/1977 | Fletcher et al. | 350/295 |
| 4,106,481 | 8/1978 | Van Kuijk | 126/425 |
| 4,111,184 | 9/1978 | Perkins | 126/425 |
| 4,134,387 | 1/1979 | Tornstrom | 126/438 |

FOREIGN PATENT DOCUMENTS 2614545  8/1977  Fed. Rep. of Germany ........... 126/438

Primary Examiner—Carroll B. Dority, Jr.
Assistant Examiner—Larry Jones
Attorney, Agent, or Firm—Andrew T. Karnakis; Frank J. Fleming

[57] ABSTRACT

A focusing solar collector which utilizes an elongated parabolic shaped mirror made from a sheet of drapable material so that when draped in a catenary like curved configuration, the sun's rays may be focused on a linear target which is axially aligned with the axis of the mirror. Means are provided for adjusting the angle of the drape of the catenary like curve in order to maintain the focus of the sun's rays on the linear target as the relative diurnal position of the sun to the collector changes. The optimum catenary like curve for the range of the drape angles involved is achieved by using a non-linear distribution of weight along the cross-section of the draped mirror material.

9 Claims, 5 Drawing Figures

FOCUSING SOLAR COLLECTOR

FIELD OF THE INVENTION

This invention relates to an improved solar collector. More particularly, this invention relates to a focusing solar collector of the type utilizing an elongated parabolic shaped mirror.

DESCRIPTION OF THE PRIOR ART

An example of a focusing solar collector which utilizes an elongated parabolic mirror is disclosed in U.S. Pat. 2,247,830 issued on July 1, 1941 to C. G. Abbott. The Abbott solar collector discloses a mirror having a rigid shape.

The book "Direct Use of the Sun's Energy" by Farrington Daniels, 1964 edition, describes on pages 42–57 a number of focusing solar collectors. The author describes the use of aluminized plastic film for the reflective surface. However, the aluminized plastic film is applied to the surface of a rigid parabolic form. He also cites an example of using air pressure to stretch a plastic film into a spherical form as a means of adjusting the focus during the process of building a rigid mirror. He then points out that when an aluminized plastic film is stretched, the stretching reduces it reflectivity appreciably.

Other prior art of general interest are the following U.S. Pat. Nos.:

3,974,824 issued Aug. 17, 1976 to Smith;
4,000,734 issued Jan. 4, 1977 to Matlock;
4,015,585 issued Apr. 5, 1977 to Fattor;
4,022,188 issued May 10, 1977 to Cohen et al.

The prior art cited above is representative of the state of the art with respect to focusing solar collectors in so far as it applies to the present invention. All prior art focusing solar collectors use mirrors having rigid shapes.

DESCRIPTION OF THE INVENTION

Before describing the present invention, several of the design problems solved by the invention will be discussed.

The energy absorption capacity of a solar collector is proportional to the absorption area upon which the solar energy is received. In order to be practical, a solar collector must have a relatively large energy absorption area. A solar collector having an elongated parabolic mirror of a rigid shape is consequently relatively large and heavy, requiring a relatively expensive and powerful focusing mechanism. Therefore, there is an advantage to providing a design which has a light weight mirror so that the focusing mechanism required is relatively less expensive and less powerful.

The cost of producing an elongated parabolic mirror having a rigid shape includes the cost of the rigid form and the cost of preparing the reflecting surface. When an aluminized plastic film is used for the reflecting surface, the cost also includes the film and the mounting of the film. Therefore, there is an obvious cost advantage in being able to use an aluminized plastic film without the need for a rigid form or the cost of mounting the film on the rigid form.

In most focusing collectors, the target is rigidly mounted so as to avoid the need for movable joints through which the heated medium must pass as it conveys the heat collected to other apparatus. Therefore, the focusing mirror structure must be such that it can be focused onto a rigidly mounted target. In addition, the target should be mounted in a position which does not block the path of the sun's rays received by the mirror.

In the discussion of the prior art, it was pointed out that a spherical parabolic mirror made of a plastic film could be brought into focus on a target by applying air pressure and then made into a rigid mirror. No suggestion was made that air pressure could be utilized as a means for automatically controlling the focus of the mirror. If air pressure were used for automatically focusing an aluminized plastic film, it would require a supply of air under pressure and the controls for applying a pressure to the mirror. It is not obvious how the same principle could be applied to shape an elongated parabolic mirror. For example, a cylindrically shaped mirror might readily be adjusted in diameter by air pressure. However, the stretching of the plastic film results in a substantial reduction in the reflectivity of the aluminized surface. It is therefore an advantage to be able to adjust the focus of a mirror made of aluminized plastic film without stretching the plastic film or requiring a source of air under pressure and the controls essential to controlling the inflation pressure.

It is an object of this invention to provide a novel focusing solar collector which has a light weight parabolic shaped mirror adapted to be focused on a target.

It is a further object of this invention to provide a novel focusing solar collector which has a light weight parabolic shaped mirror having an adjustable shape for maintaining the focus on the target for changing positions of the sun with respect to the collector.

It is another object of this invention to provide a novel focusing solar collector which has a light weight parabolic shaped mirror adapted to be adjustably focused on a rigidly mounted target.

It is a still further object of this invention to provide a novel focusing solar collector having a mirror which is inexpensive to construct.

It is still another object of this invention to provide a novel focusing solar collector which requires a minimum amount of energy to operate.

The objects of this invention are achieved by forming a novel elongated parabolic mirror by draping an aluminized plastic film to form a modified catenary curve. Inasmuch as no rigid form is used, the parabolic mirror is inexpensive to make and light weight.

The term "catenary" is defined as the curve assumed by a cord when the cord is uniformly loaded along its length. In the case of a very flat arc produced by a taut cord, the equation for such a catenary curve closely approximates that equation for a parabola. The invention departs from the above definition in two ways. First, the elongated parabolic mirror is formed by draping a plastic film, thus adding a width dimension not found in a cord. Secondly, for the axis of the parabola to be aligned with to the sun's rays, the angle of drape is greater than that at which a suspended cable will approximate a parabolic curve. Therefore, the cross-section of the pliable film is made non-uniform so as to compensate for the range of angles through which the plastic film may be moved in order to maintain the focus of the rays on a rigidly mounted target which is located so that it does not block the path of the rays received on the reflective surface of the mirror.

The adjustment for focusing the rays on the target may be performed either manually or automatically. The automatic control system is preferably one which is actuated by sensing elements located in the proximity of the target so as to maintain a focusing position which directs the maximum available energy to the target area.

DESCRIPTION OF THE DRAWINGS

An understanding of the general nature of this invention and an appreciation of its many advantages will be gained from a study of the following description given in connection with the drawings in which.

DESCRIPTION OF PREFERRED EMBODIMENTS

Figure 1:
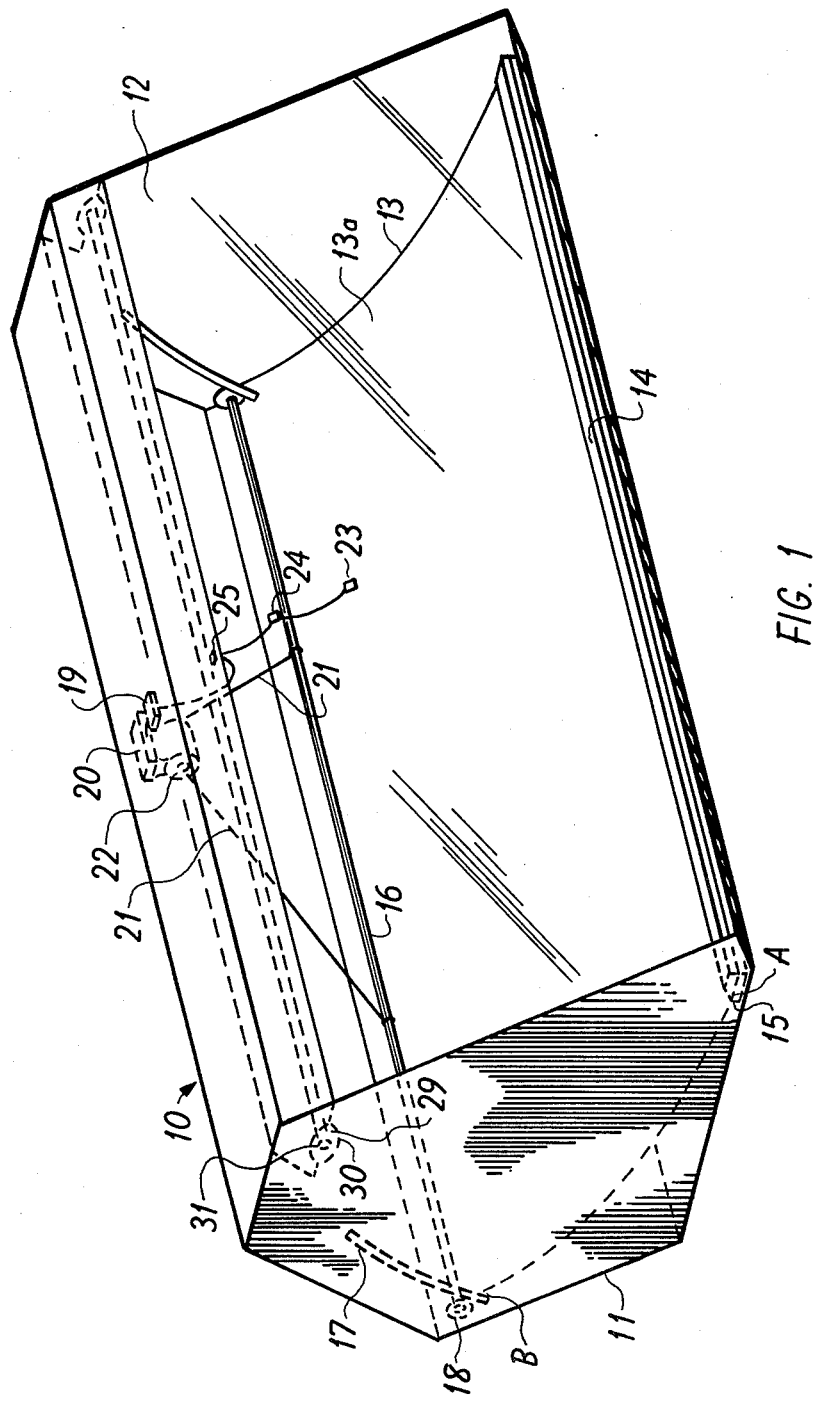
FIG. 1 is a perspective view of the focusing collector.
Figure 2:
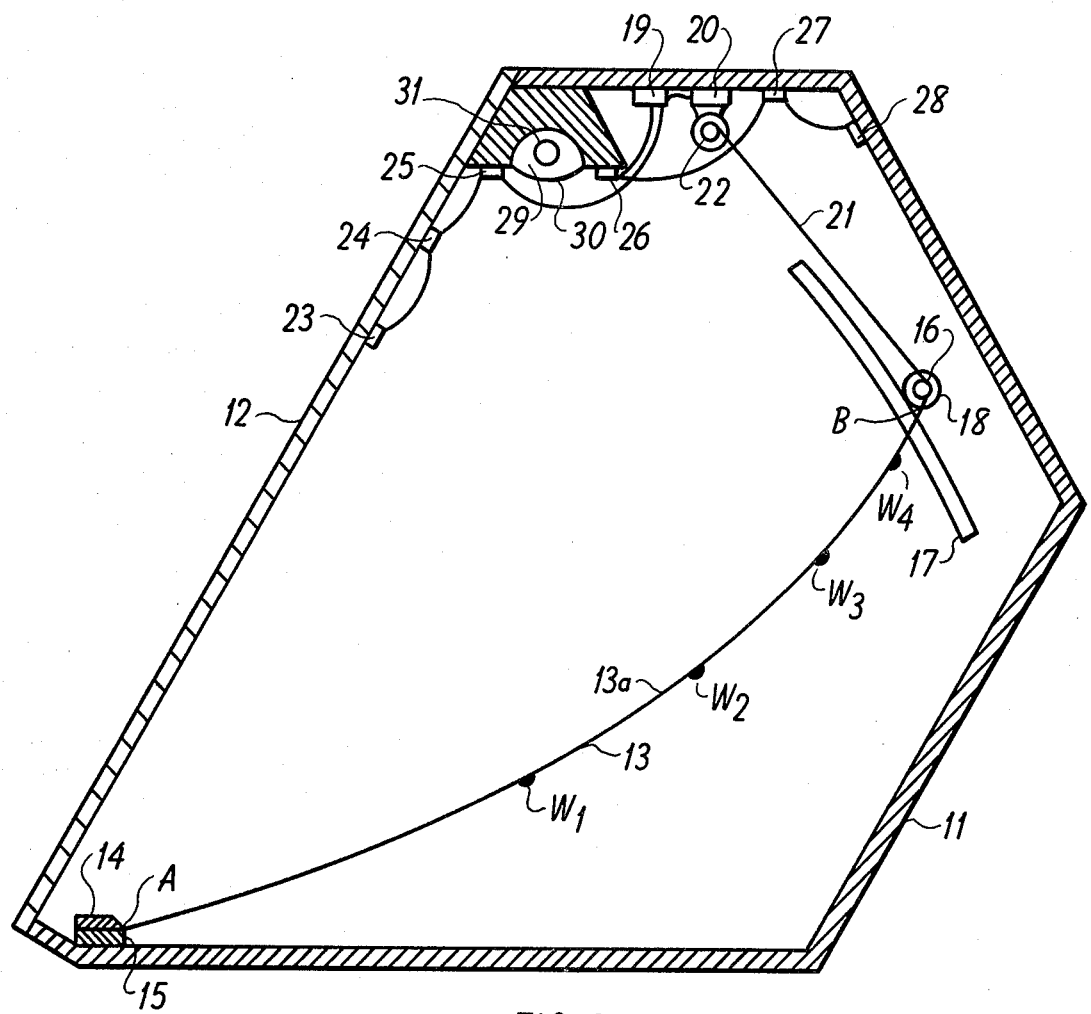
FIG. 2 is a cross-sectional view taken from the right end of the view in FIG. 1.

Referring to FIGS. 1 and 2, the focusing solar collector 10 of this invention is enclosed in casing 11, which has a transparent panel 12 along one side thereof through which the rays of the sun pass to impinge on the reflective surface 13a of a sheet of drapable material 13. Drapable material 13 may be a plastic film having one surface aluminized to provide a reflective surface 13a. Drapable material 13 is attached at its lower edge by cleat 14 to the upper surface of rib 15, which is mounted on the inner surface of casing 11. Thus the mounted edge of drapable material 13 is raised by rib 15 above the surface of casing 11. The upper edge of drapable material 13 is attached to bar 16. Thus drapable material 13 extends parallel to the longitudinal axis of casing 11 and drapes at an angle to the horizontal axis of casing 11. On each end of casing 11 is mounted arced track 17 arranged so that rollers 18 rotatively mounted on each end of bar 16 will travel along the upper surface of arced track 17. The center of an arced track 17 is on the axis parallel to the lower edge of drapable material 13.

Mounted on the inner surface of casing 11 in a central position near the top thereof are control circuit 19 and positioning motor 20. One end of cord 21 is attached to pulley 22 of positioning motor 21 and the other end thereof to bar 16. Sensing elements 23, 24 and 25 are connected to control circuit 19 and sensing elements 26, 27, and 28 (not show in FIG. 1, see FIGS. 2, 4 and 5) are also connected thereto.

Mounted longitudinally within casing 11 in the space adjacent the upper edge of the transparent panel 12 parallel to the longitudinal axis of casing 11 is target chamber 29 which is covered by transparent panel 30 to provide a "green house" effect. Within chamber 29 is mounted black body 31 which absorbs the energy of the sun's rays and is adapted to transfer that energy to other apparatus (not shown). By way of example, black body 31 may be a conduit through which either air or water flows and absorbs energy for transfer to the other apparatus for utilization.

Figure 3:
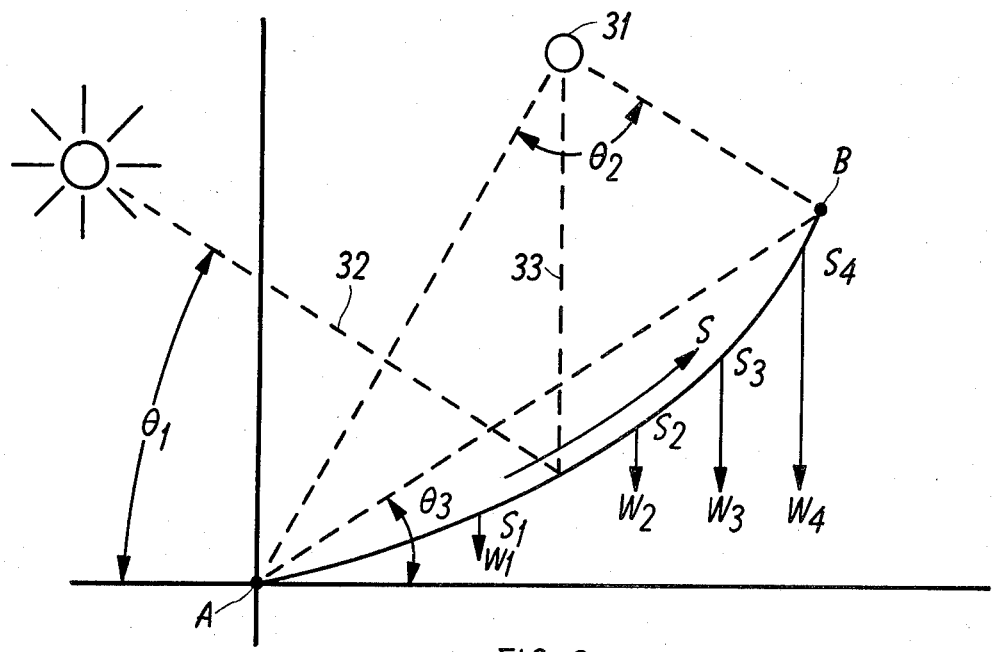
FIG. 3 is a cross-sectional diagram of the aluminized plastic film which forms the adjustable mirror.

The operation of focusing solar collector 10 will now be explained with reference to FIGS. 1, 2 and 3. The mirror surface 13a of drapable material 13 is oriented so that its longitudinal axis is at right angles to solar south.

The angle $\theta_1$ of the sun's rays 32 from horizontal depends upon the latitude at which focusing solar collector 10 is located, the season of the year and the time of the day. At a latitude of 40°, for example, the useful range of angle $\theta_1$ may vary from 10 degrees in the winter to 73.5 degrees in the summer. Therefore, in order that the sun' rays 32 which impinge on mirror surface 13a of drapable material 13 will be reflected along path 33 to impinge on black body 31, the drapable material 13 must assume a shape which is substantially parabolic regardless of the drape angle $\theta_3$ represented by a line through the edges A and B of drapable material 13. The edges A and B of drapable material 13 are located to present an effective mirror surface within a rim angle $\theta_2$ of 90 degrees, which is equal to one half of a parabolic curve.

When the drape angle $\theta_3$ is zero degrees, drapable material 13 will assume a parabolic curve provided it is taut and uniformly loaded between edges A and B; i.e. is uniform in thickness. However, the further the drape angle $\theta_3$ departs from zero degrees, the greater the departure of the assumed curve will be from a true parabola. In order to cause the drapable material 13 to assume a curve which is substantially parabolic when the drape angle $\theta_3$ departs from zero degrees, the drapable material 13 is provided with some slack and a series of weights $W_1$-$W_4$ are attached longitudinally to drapable material 13 at empirically selected distances from edge B and with empirically selected weights to produce a nonuniform weight distribution of drapable material 13 between edges A and B. The weight of weights $W_1$-$W_4$ and their location necessary to produce the parabolic shape varies as the drape angle $\theta_3$ varies. Therefore, the selection of the best combination of weights $W_1$-$W_4$ and their location on drapable material 13 may be for a range of drape angles $\theta_3$ best for the principle purpose of the focusing solar collector. For example, at 40 degrees latitude, the range of the drape angle $\theta_3$ for providing heat during the winter months might be from 10 to 50 degrees.

Referring to FIGS. 1 and 2, drape angle $\theta_3$ is automatically adjusted by positioning motor 20. Sensing elements 23, 24, 25, 26, 27 and 28 are protected from the direct rays of the sun and are conncted to control circuit 19 so that when the path 33 of the reflected rays energizes any one of sensing elements 23, 24 and 25 more than sensing elements 26, 27 and 28, then positioning motor 20 unwinds cord 21 to lower bar 16 along arced track 17 until the energization of each group of sensing elements has equalized. In like manner, when any one of sensing elements 26, 27 and 28 is energized more than sensing elements 23, 24 and 25, positioning motor 20 winds up cord 21 to raise bar 16 along arced track 17 until the energization of each group of sensing elements has equalized. Thus, the path 33 of the reflected rays of the sun is maintained focused on black body 31.

Figure 4:
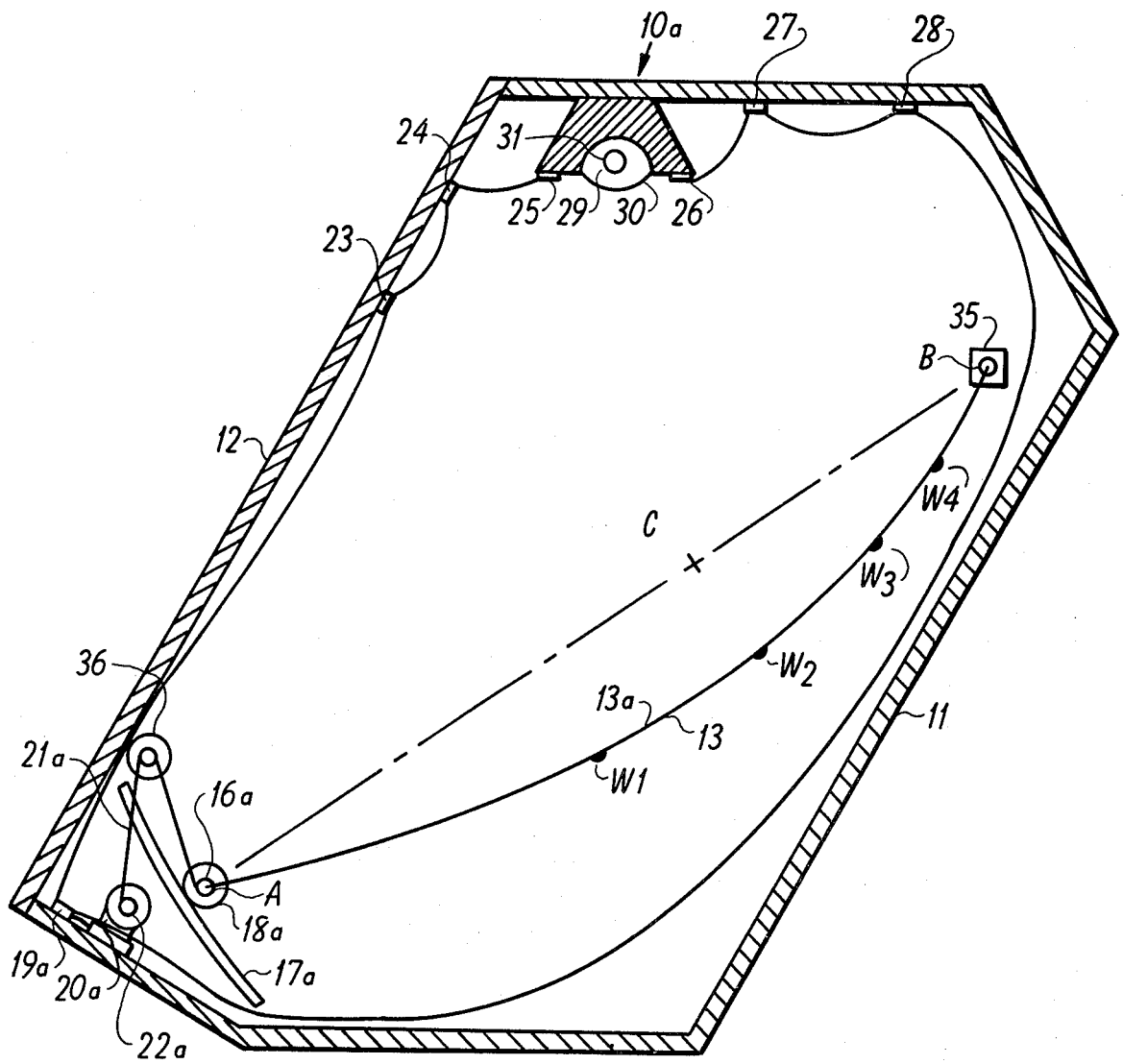
FIG. 4 is a cross-sectional view similar to FIG. 2 showing means for adjusting the drape angle of the aluminized plastic film by adjusting the position of the lower edge thereof.

FIG. 4 shows focusing solar collector 10a in which lower edge A of drapable material 13 is moved while upper edge B in maintained in a fixed position. Lower edge A of drapable material 13 is attached to bar 16a. At each end of casing 11 is mounted arced track 17a arranged so that rollers 18a rotatively mounted at each end of bar 16a will travel along the upper surface of arced track 17a. The center C of the arc of arced track 17a is empirically selected for the range of drape angles $\theta_3$ for a particular focusing solar collector 10a. The upper edge B of drapable material 13 is attached to bar 35 which is mounted longitudinally in casing 11.

Target chamber 29, transparent cover 30, black body 31 and heat sensing elements 23, 24, 25, 26, 27 and 28 are located in the same position within casing 11 as in the embodiment shown in FIGS. 1 and 2.

Positioning motor 20a is mounted below arced track 17a. One end of cord 21a is attached to pulley 22a of positioning motor 20a and passes over pulley 36 attached to the outer end of arced track 17a. The other end of cord 21a is attached to bar 16a.

The operation of focusing solar collector 10a is the same as that of focusing solar collector 10, except that the lower edge A of drapable material 13 is moved as the means for adjusting drape angle $\theta_3$.

Figure 5:
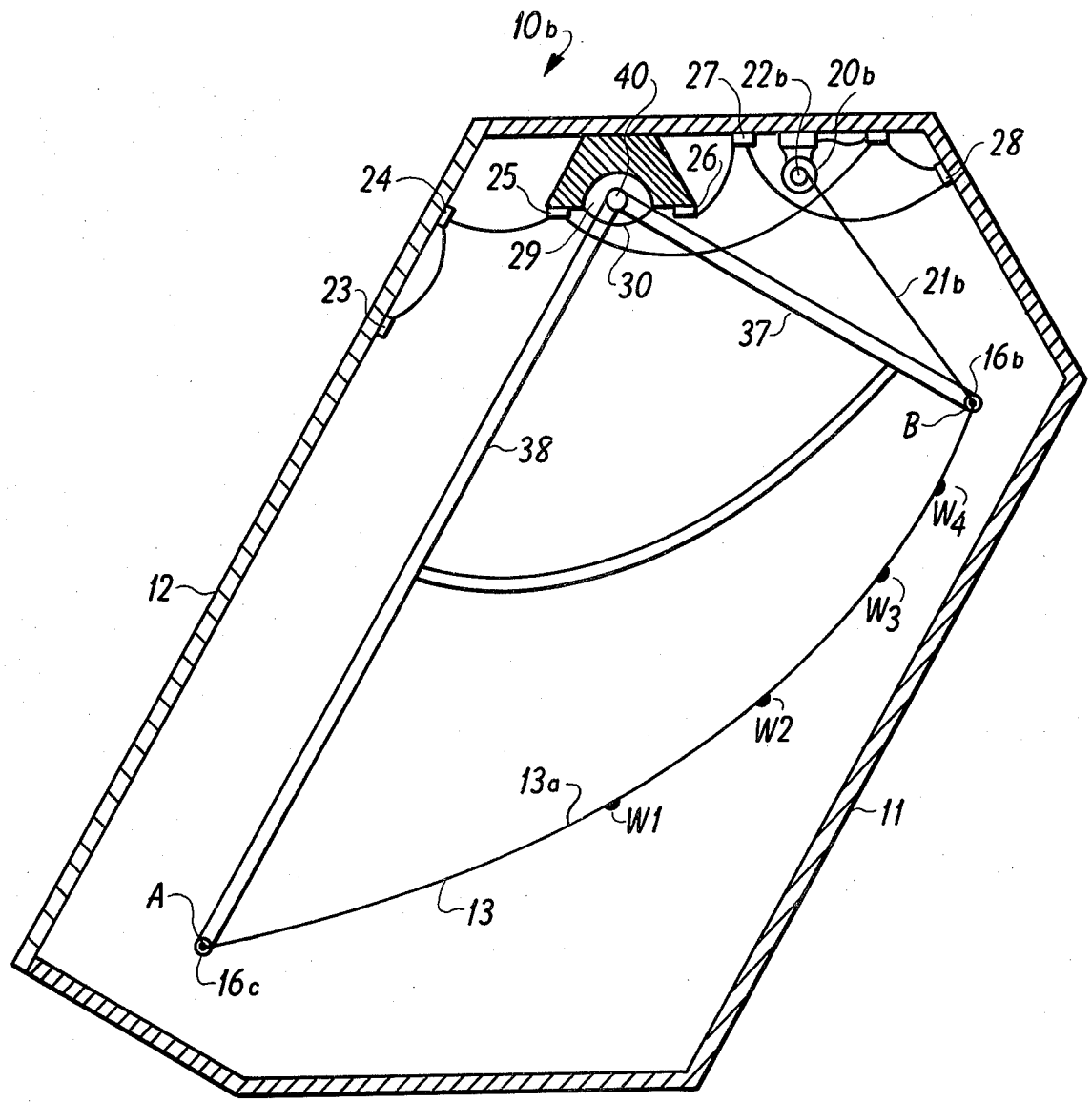
FIG. 5 is a cross-sectional view similar to FIG. 2 showing means for adjusting the drap angle of the aluminized plastic film by adjusting both edges thereof.

FIG. 5 shows focusing solar collector 10b on which both ends A and B of drapable material 13 are moved simultaneously. Upper rod 16b is attached to upper edge B of drapable material 13 and lower rod 16c is attached to the lower edge A of drapable material 13. Each of the rods 16b and 16c is mounted on arms 37 and 38 respectively of frame 39. Positioning motor 20b is mounted on the upper surface of casing 11. One end of cord 21b is attached to pulley 22b of positioning motor 20b. The other end of cord 21b is attached to bar 16b.

Target chamber 29, transparent cover 30, black body 31 and sensing elements 23, 24, 25, 26, 27 and 28 are mounted in the same positions within casing 11 as in the embodiments shown in FIGS. 1 and 2. In this FIG. 5, black body 31 is indicated as hidden by pivot 40 of frame 39.

The operation of focusing solar collector 10b is the same as that of focusing solar collector 10, except that both the lower edge A and upper edge B of drapable material 13 are moved simultaneously as the means for adjusting drape angle $\theta_3$.

I claim:

1. A tracking solar collector comprising:
   first and second elongate support means positioned apart from one another with their longitudinal axes generally parallel;
   a sheet of flexible material suspended between said support means having a reflective surface receiving solar rays and focusing said rays along a focal axis parallel to said support means;
   an elongate absorber positioned at the focal axis of said reflective surface;
   means for moving one of said support means in response to the diurnal movement of the sun thereby altering the shape of said material; and
   said material being non-uniformly loaded along its cross section such that when the shape is altered the focus will be maintained at said focal axis.

2. The solar collector of claim 1 wherein said means for moving moves both of said support means to maintain the focus.

3. The solar collector of claim 1 including solar sensing means and position control means responsive to said solar sensing means for adjusting the shape of said material to maintain the focus on said focal axis over a range of solar elevation angles.

4. The solar collector of claim 3 wherein said solar sensing means comprise two sets of sensors, each set on opposite sides of said focal axis;
   said position control means responding to an unbalance in signal intensity from each set and moving said one support means until a balanced condition is achieved thereby maintaining the focus on said focal axis.

5. The solar collector of claim 1 including housing means encasing both of said support means and said flexible material, said housing means having a transparent panel for admitting solar rays.

6. The solar collector of claim 1 including solar target means adjacent said focal axis.

7. The solar collector of claim 6 including housing means encasing both of said support means, said flexible material and said solar target means, said housing means having a transparent face for admitting solar rays.

8. The solar collector of claim 1 wherein said flexible material comprises a plastic film with an aluminized reflective surface.

9. The solar collector of claim 1 wherein the shape of said flexible material is maintained along a parabolic curve.

* * * * *